(12) United States Patent
Vezat et al.

(10) Patent No.: US 12,451,567 B2
(45) Date of Patent: Oct. 21, 2025

(54) ELECTROCHEMICAL ASSEMBLY, CORRESPONDING BATTERY AND METHOD

(71) Applicant: SAFT, Levallois Perret (FR)

(72) Inventors: Christian Vezat, Saint Jean d'Illac (FR); Maxence Bardiau, Le Haillan (FR)

(73) Assignee: SAFT, Levallois Perret (FR)

( * ) Notice: Subject to any disclaimer, the term of this patent is extended or adjusted under 35 U.S.C. 154(b) by 471 days.

(21) Appl. No.: 17/926,525

(22) PCT Filed: May 20, 2021

(86) PCT No.: PCT/EP2021/063508
§ 371 (c)(1),
(2) Date: Nov. 18, 2022

(87) PCT Pub. No.: WO2021/234106
PCT Pub. Date: Nov. 25, 2021

(65) Prior Publication Data
US 2023/0198107 A1 Jun. 22, 2023

(30) Foreign Application Priority Data
May 20, 2020 (FR) ...................... 20 05291

(51) Int. Cl.
*H01M 50/533* (2021.01)
*H01M 50/103* (2021.01)
(Continued)

(52) U.S. Cl.
CPC ....... *H01M 50/533* (2021.01); *H01M 50/103* (2021.01); *H01M 50/15* (2021.01); *H01M 50/536* (2021.01); *H01M 50/55* (2021.01)

(58) Field of Classification Search
CPC .... H01M 50/15; H01M 50/536; H01M 50/55; H01M 50/103; H01M 50/533
See application file for complete search history.

(56) References Cited

U.S. PATENT DOCUMENTS 7,932,700 B2 * 4/2011 Cintra ................ H01M 10/052
320/140
2006/0051664 A1 3/2006 Tasai et al.
(Continued)

FOREIGN PATENT DOCUMENTS

CN 205543009 U 8/2016
EP 2 330 661 A1 6/2011
(Continued)

OTHER PUBLICATIONS

The decision of EPO to grant a Patent (Year: 2025).*
(Continued)

*Primary Examiner* — Alexander Usyatinsky
(74) *Attorney, Agent, or Firm* — Troutman Pepper Locke LLP

(57) ABSTRACT

An electrochemical assembly includes a first stack of electrochemical elements provided with a first electrical connection tab with a first polarity. The first stack of electrochemical elements extends along a stacking plane. A first common connection element is adapted to electrically connect the first electrical connection tab to an electrical connection terminal with the first polarity.

13 Claims, 13 Drawing Sheets

(51) Int. Cl.
  *H01M 50/15* (2021.01)
  *H01M 50/536* (2021.01)
  *H01M 50/55* (2021.01)

(56) References Cited

U.S. PATENT DOCUMENTS

| | | | |
|---|---|---|---|
| 2007/0105015 A1* | 5/2007 | Munenaga | H01M 10/0431 |
| | | | 429/161 |
| 2011/0076532 A1 | 3/2011 | Ha | |
| 2011/0136000 A1* | 6/2011 | Moon | H01M 50/536 |
| | | | 429/163 |
| 2014/0227579 A1* | 8/2014 | Kwon | H01M 6/46 |
| | | | 429/152 |
| 2016/0336574 A1 | 11/2016 | Guen et al. | |
| 2019/0074487 A1 | 3/2019 | Guo et al. | |

FOREIGN PATENT DOCUMENTS

| | | |
|---|---|---|
| EP | 2 500 964 A2 | 9/2012 |
| EP | 2 866 279 A1 | 4/2015 |
| EP | 2 953 186 A1 | 12/2015 |
| EP | 3 451 409 A1 | 3/2019 |
| KR | 10-1233626 B1 | 2/2013 |
| WO | 2018030570 A1 | 2/2018 |
| WO | 2018126439 A1 | 7/2018 |
| WO | 2018159618 A1 | 9/2018 |
| WO | WO-2018237381 A2 * 12/2018 ......... H01M 10/044 |

OTHER PUBLICATIONS

Rapport De Recherche International issued in International Patent Application No. PCT/EP2021/063508.
Rapport De Recherche Preliminaire issued in French Patent Application No. 2005291 dated Feb. 2, 2021.

* cited by examiner

ELECTROCHEMICAL ASSEMBLY, CORRESPONDING BATTERY AND METHOD

CROSS REFERENCE TO RELATED APPLICATIONS

The present application is a U.S. National Phase Application under 35 U.S.C. § 371 of International Patent Application No. PCT/EP2021/063508 filed May 20, 2021, which claims priority of French Patent Application No. 20 05291 filed May 20, 2020. The entire contents of which are hereby incorporated by reference.

FIELD OF THE INVENTION

The present invention relates to an electrochemical assembly, of the type comprising
a first stack of electrochemical elements provided with a first electrical connection tab with a first polarity,
the first stack of electrochemical elements extending along a stacking plane,
a first common connection element suitable for electrically connecting the first electrical connection tab to an electrical connection terminal with the first polarity.

BACKGROUND

Electrochemical assemblies are known, e.g. from US2019/0074487. The electrochemical assembly comprises two stacks of electrochemical elements, each of which comprises an electrical connection tab. The tabs are arranged on top of each other and are supported by a support plate arranged over both stacks. The tabs extend on both sides around the edges of the support plate. The tabs and the support plate are stacked over the two stacks of electrochemical elements.

Other electrochemical assemblies or electrochemical batteries are known from WO2018159618A1; EP3451409A1; WO2018126439A1; WO2018030570A1; US2016336574A1; CN205543009U; EP2866279A1; EP2953186A1; EP2500964A2; US2011076532A1 and KR101233626B1.

SUMMARY

The goal of the invention is to propose an easy and economical method for manufacturing an electrochemical assembly. In particular, the goal of the invention is to propose a reliable, economical and compact connection between the electrodes and the terminals of the electrochemical assembly.

To this end, the subject matter of the invention relates to an electrochemical assembly of the type defined above, characterized in that the first common connection element comprises a first electrical connection rib fastened to the first electrical connection tab, in that
 the electrochemical assembly comprises a first support element, in that
 the first electrical connection tab is arranged between the first electrical connection rib and the first support element.
 in particular, that the first electrical connection tab and the first electrical connection rib extend substantially parallel to the stacking plane.
According to particular embodiments of the electrochemical assembly, same can have one or more of the following features:

the electrochemical assembly comprises
 a second stack of electrochemical elements provided with a second electrical connection tab with the first polarity,
 the second stack of electrochemical elements extending along the stacking plane,
 the first common connection element electrically connecting the first electrical connection tab and the second electrical connection tab is suitable for connecting the second electrical connection tab to the electrical connection terminal with the first polarity, wherein
 the first common connection element comprises a second electrical connection rib fastened to the second electrical connection tab, wherein
 the electrochemical assembly comprises a second support element, wherein
 the second electrical connection tab is arranged between the second electrical connection rib and the second support element, in particular wherein
 the second electrical connection tab and the second electrical connection rib extend substantially parallel to the stacking plane;
the electrochemical assembly comprises a first support component which forms the first support element and the second support element which comprises at least one central core arranged between the first support element and the second support element,
 the central core is arranged either substantially perpendicularly or substantially parallel to a support plane defined by the first support element and the second support element;
the first common connection element is fastened to the first electrical connection tab by a material connection, in particular by laser welding, and the first electrical connection tab is fastened to the first support element by a material connection, in particular by laser welding, and/or
the first common connection element is fastened to the second electrical connection tab by a material connection, in particular by laser welding, and the second electrical connection tab is fastened to the second support element by a material connection, in particular by laser welding;
the first common connection element comprises an electrical connection core arranged between the first electrical connection rib and the second electrical connection rib;
the electrical connection core is stepped and comprises a terminal portion and an end portion, the terminal portion being offset towards the stack of electrochemical elements with respect to the end portion;
the first electrical connection rib and the second electrical connection rib are arranged between the first and the second electrical connection tabs, and wherein
 the first electrical connection tab and the second electrical connection tab are arranged between the first and the second support elements;
the first support element and the second support element are arranged between the first and the second electrical connection tabs, and wherein
the first electrical connection tab and the second electrical connection tab are arranged between the first electrical connection rib and the second electrical connection rib;
the first stack of electrochemical elements is provided with a third electrical connection tab with a second polarity, and the second stack of electrochemical elements is provided with a fourth electrical connection tab with the second polarity, the electrochemical assembly comprising a second common connecting element, electrically connecting the third electrical connection tab and the fourth electrical connection tab and suitable for electrically connecting the third electrical connection tab and the fourth electrical connection tab to an electrical connection terminal with the second polarity, the second common connecting element comprises
  a third electrical connection rib fastened to the third electrical connection tab, and
  a fourth electrical connection rib, fastened to the fourth electrical connection tab, wherein the electrochemical assembly comprises a second support element which forms a third support element and a fourth support element which comprises at least one central core arranged between the third support element and the fourth support element, wherein the third electrical connection tab is arranged between the third electrical connection rib and the third support element, and the fourth electrical connection tab is arranged between the fourth electrical connection rib and the fourth support element, and in particular wherein the third electrical connection tab and the third electrical connection rib extend substantially parallel to the stacking plane and the fourth electrical connection tab and the fourth electrical connection rib extend substantially parallel to the stacking plane;

the first common connection element and the second common connection element have an identical shape and are arranged according to a plane symmetry configuration with respect to a symmetry plane.

The invention further relates to a battery of the type comprising:
  a casing,
  a cover provided with an electrical connection terminal with a first polarity and preferentially with an electrical connection terminal of a second polarity
  an electrochemical assembly,
  characterized in that
  the electrochemical assembly is an electrochemical assembly as defined above, and in that
  the first common connection element is electrically connected to the electrical connection terminal with the first polarity.

The further subject matter of the invention is a manufacturing process for an electrochemical assembly, comprising the following steps:
  providing the first stack of electrochemical elements with the first electrical connection tab with the first polarity,
  providing the first common connection element suitable for electrically connecting the first electrical connection tab to the electrical connection terminal with the first polarity,
  arranging the first electrical connection tab between the first electrical connection rib and the first support element, and
  fastening and connecting the first electrical connection rib and the first support element to the first electrical connection tab.

BRIEF DESCRIPTION OF THE DRAWINGS

The invention will be better understood upon reading the following description, given only as an example and making reference to the enclosed drawings, wherein.

DETAILED DESCRIPTION

The following description contains technical features of the invention. Such technical features, although presented in a technical context and, if appropriate, in combination with other technical features, can be used individually each time, without the other technical features, insofar as technically possible.

Figure 1:
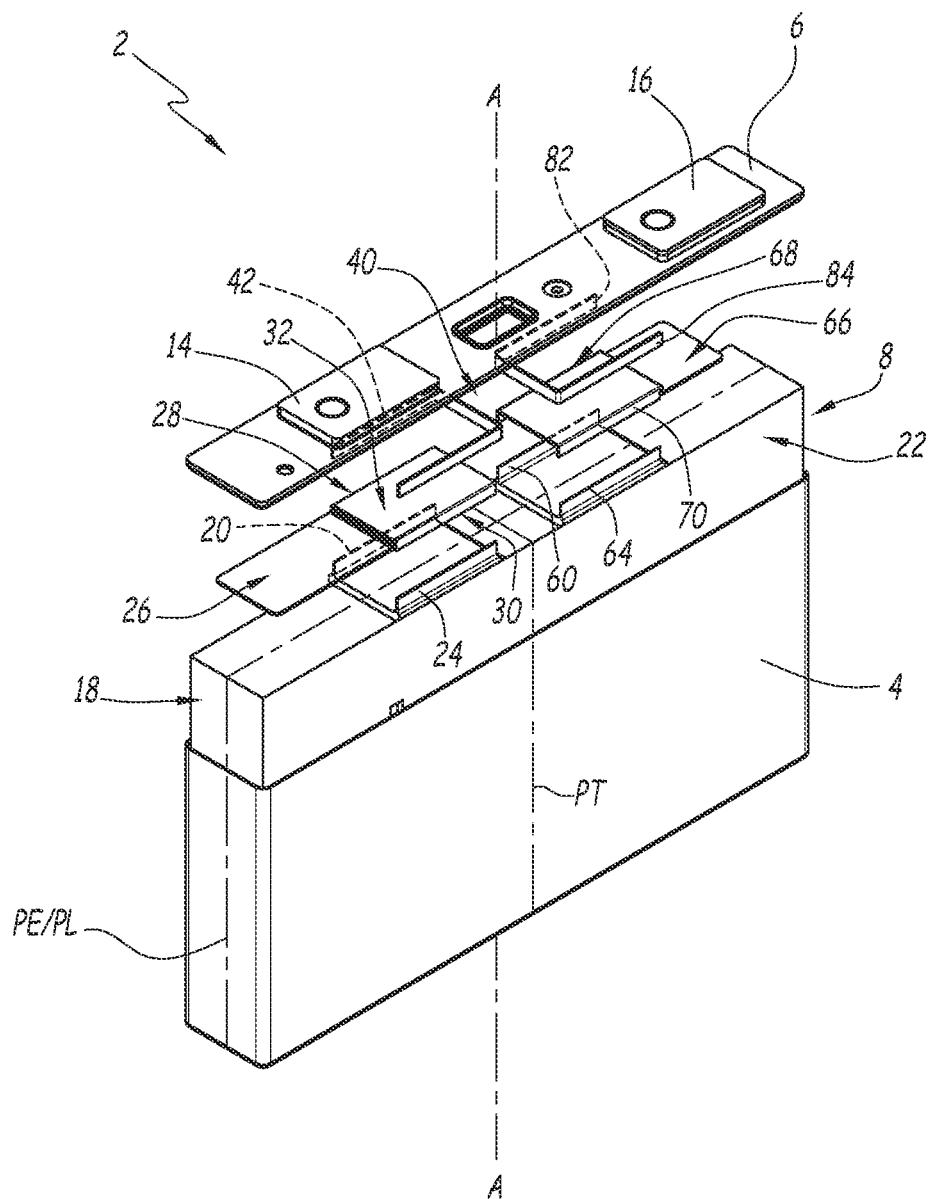
FIG. 1 is an exploded perspective schematic view of an electrochemical battery according to a first embodiment of the invention.

FIG. 1 shows a battery according to the invention, as indicated by the general reference 2. In said figure, the battery 2 is shown in perspective, in an exploded view.

The battery 2 is an electrochemical battery, as used in electric vehicles. However, other areas of application of the battery 2 are conceivable, such as energy storage, electrical mobility, aviation, railways.

The battery 2 comprises a casing 4, a cover 6 and an electrochemical assembly 8.

The battery 2, and hence the electrochemical assembly 8, defines the following geometric entities:
  PL—longitudinal plane—a plane which extends generally parallel to large faces of the casing and perpendicular to a bottom of the casing;
  PT—transverse plane—a plane which extends generally parallel to small faces of the casing and perpendicular to the bottom of the casing;
  PE—stacking plane—plane on which the electrode layers are stacked;
  A—central axis—the axis passing through the center of the battery and generally coinciding with the line generated by the section of the longitudinal plane PL and the transverse plane PT.

The or each of the PL/PT/PE planes extends in the present case in a corresponding plane of symmetry of the battery.

The cover 6 is provided with an electrical connection terminal with a first polarity 14 and an electrical connection terminal with a second polarity 16. The cover 6 is in the present case a substantially rectangular plate.

The electrochemical assembly 8 comprises a first stack of electrochemical elements 18 which is provided with a first electrical connection tab 20. The electrochemical assembly 8 comprises a second stack of electrochemical elements 22 which is provided with a second electrical connection tab 24. Each stack of electrochemical elements is commonly referred to as a "Stack".

The first stack of electrochemical elements 18 and the second stack of electrochemical elements 22 are arranged in the casing 4 and are electrically connected to each other by an electrical connection in parallel.

The battery 2 can comprise any number of electrochemical elements 8.

The first electrical connection tab 20 consists of an overlay of metal strips which are connected or are formed in one piece with current collectors of the first stack of electrochemical elements 18. The second electrical connection tab 24 consists of an overlay of metal strips which are connected or formed in one piece with current collectors of the second stack of electrochemical elements 22. The above-described arrangement is shown schematically in FIG. 6.

The first electrical connection tab 20 extends substantially parallel to the stacking plane PE. The second electrical connection tab 24 extends substantially parallel to the stacking plane PE. The term "substantially parallel" refers to parallelism to within manufacturing tolerances, e.g. comprised between 0° and 3°.

The or each electrical connection tab is an unfolded tab and is substantially planar over the whole extent thereof.

The first stack of electrochemical elements 18 and the second stack of electrochemical elements 22 extend on either side of the stacking plane PE.

The first electrical connection tab 20 and/or the second electrical connection tab 24 are arranged on the corresponding stack of electrochemical elements on the side furthest from the other stack of electrochemical elements. The first electrical connection tab 20 and/or the second electrical connection tab 24 are thus arranged closer to a free face of the stack of electrochemical elements adjacent to the casing 4, than to the longitudinal plane PL.

The electrochemical assembly 6 comprises a first common connection element 26 (also called "collector"), electrically connecting the first electrical connection tab 20 and the second electrical connection tab 24. The first connection element 26 consists e.g. of a folded metal sheet.

The common connection element 26 is fastened and electrically connected to the electrical connection terminal 14 and electrically connects the first electrical connection tab 20 and the second electrical connection tab 24 to the electrical connection terminal 14.

The first common connection element 26 comprises a first electrical connection rib 28 fastened to the first electrical connection tab 20, and a second electrical connection rib 30 fastened to the second electrical connection tab 24. In general, each of the electrical connection ribs has a thickness greater than the electrical connection tab, and than each of the strips of the electrical connection tab, respectively, to which said rib is associated and fastened.

The first common connection element 26 comprises an electrical connection core 32 arranged between the first electrical connection rib and the second electrical connection rib The electrical connection core 32 comprises an end portion 34 and a terminal portion 36, the terminal portion being offset toward the stack of electrochemical elements 22 with respect to the end portion 34. In the present case, the electrical connection core 32 is stepped (see FIG. 2).

The first electrical connection rib 28 and the second electrical connection rib 30 are arranged between the first and the second electrical connection tabs 20, 24.

The first electrical connection rib 28 extends substantially parallel to the stacking plane PE. The second electrical connection rib 30 extends substantially parallel to the stacking plane PE.

Figure 2:
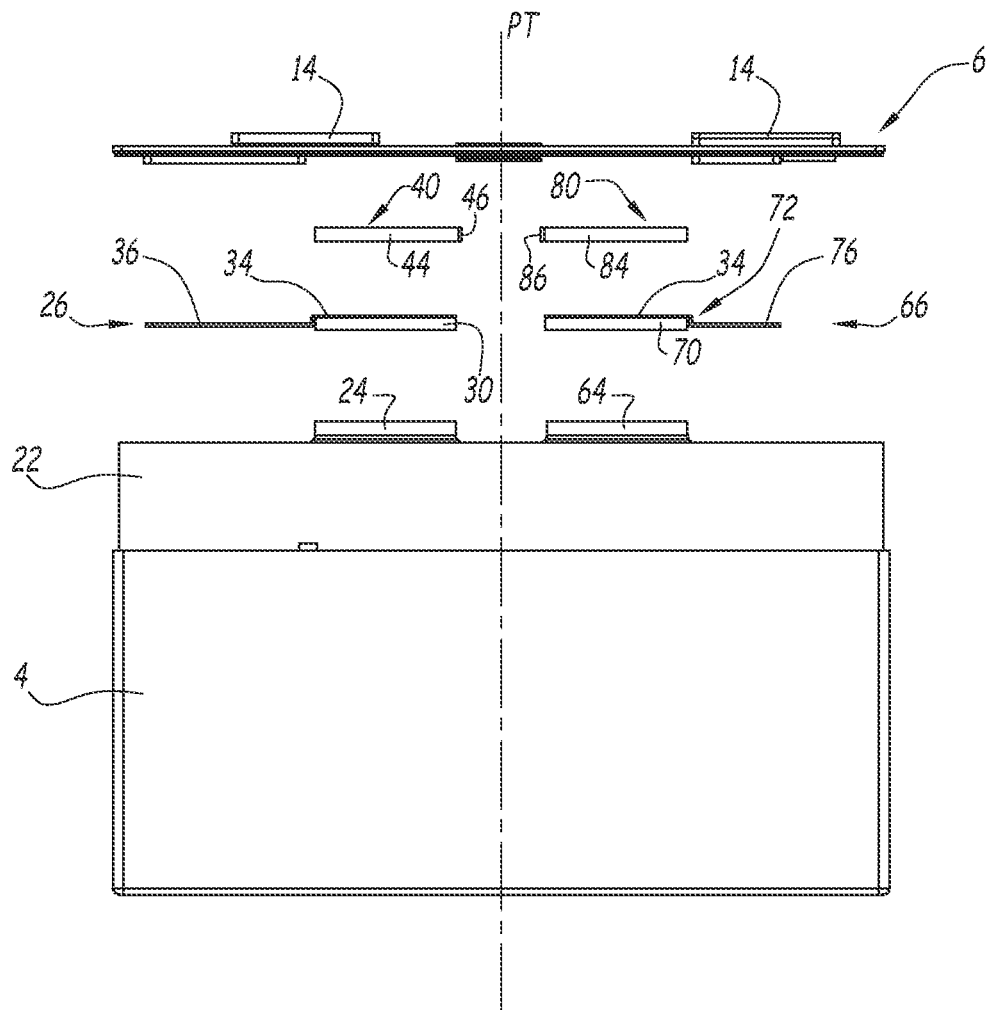
FIG. 2 is an exploded side schematic view of an electrochemical battery according to a first embodiment of the invention.
Figure 3:
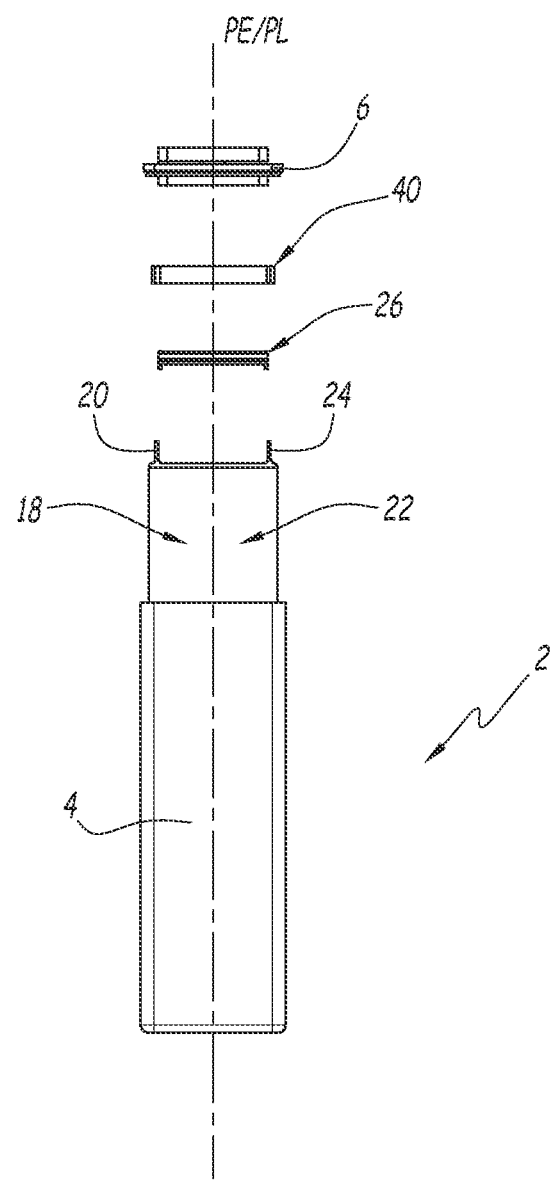
FIG. 3 is an exploded front schematic view of an electrochemical battery according to a first embodiment of the invention.
Figure 4:
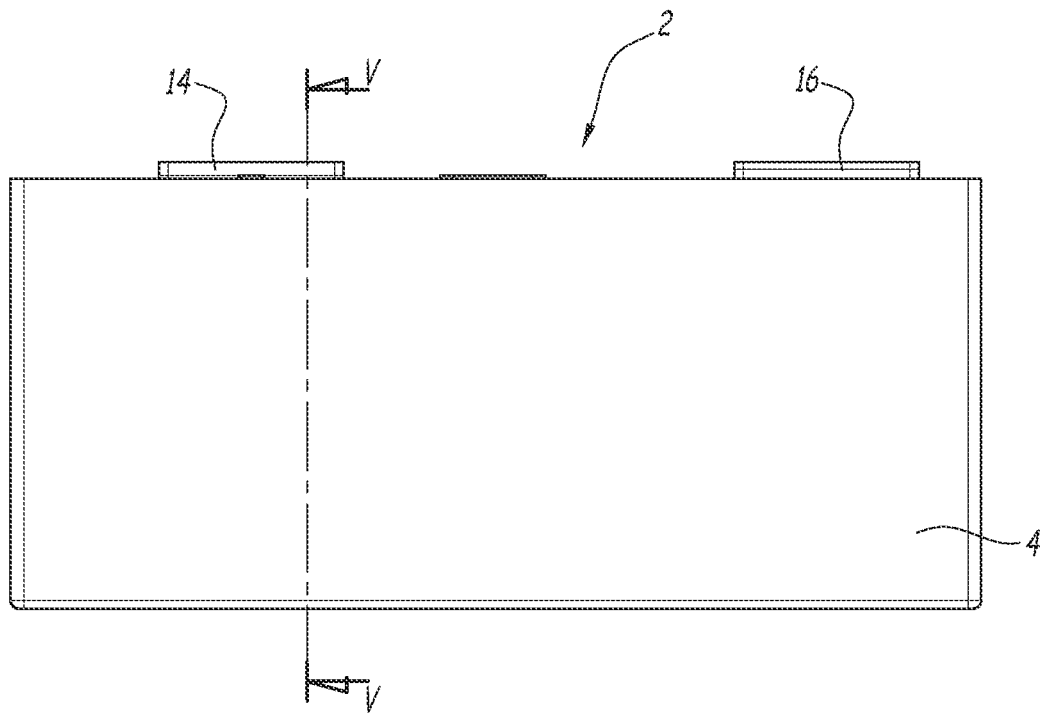
FIG. 4 is a schematic side view of the electrochemical battery in the assembled state, according to the first embodiment of the invention.
Figure 5:
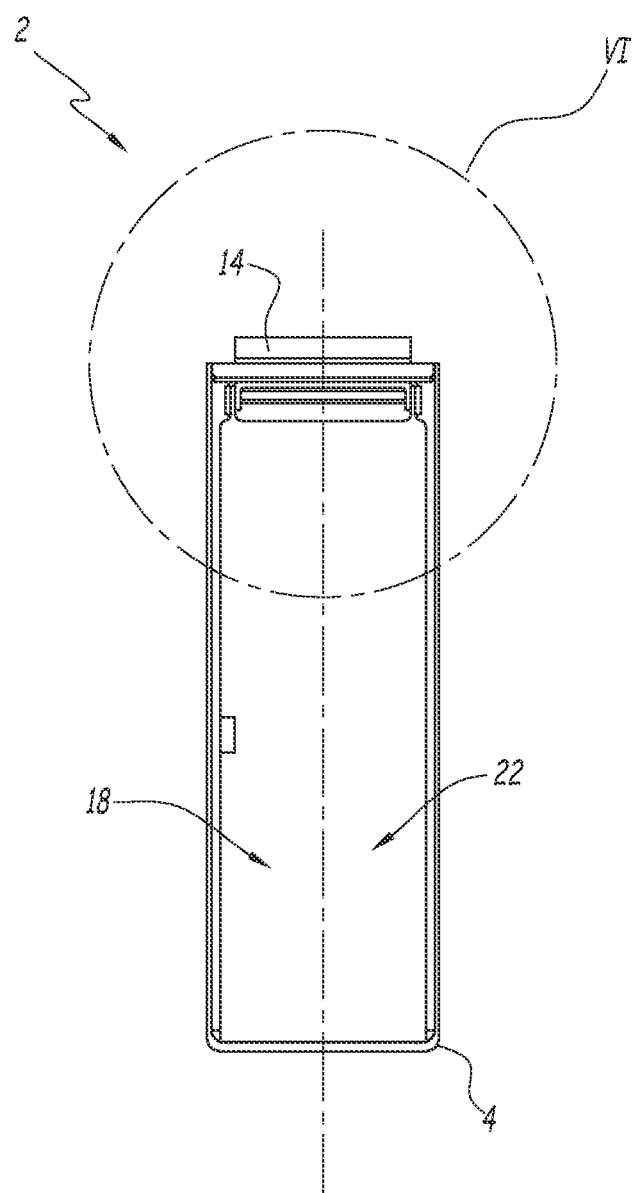
FIG. 5 is a section along the plane V-V shown in FIG. 4.

As can be seen in FIGS. 1 and 2, the first electrical connection rib 28, the first electrical connection tab 20, the second electrical connection rib 30, and the second electrical connection tab 24 are offset from the end portion 36, and from the associated terminal 14, respectively. A compact structure of the battery 2 is thus obtained.

The casing 4 is e.g. a rectangular parallelepiped casing made of metal or of a thermoplastic material. As a variant, the casing 4 has a cylindrical shape with a circular cross-section. The casing 4 has walls which are less deformable than the walls of the stacks of electrochemical elements 18 and 22.

Furthermore, the electrochemical assembly comprises a first support component 40, in particular a single piece, which forms a first support element 42, a second support element 44 and which comprises a central core 46 arranged between the first support element and the second support element.

Figure 6:
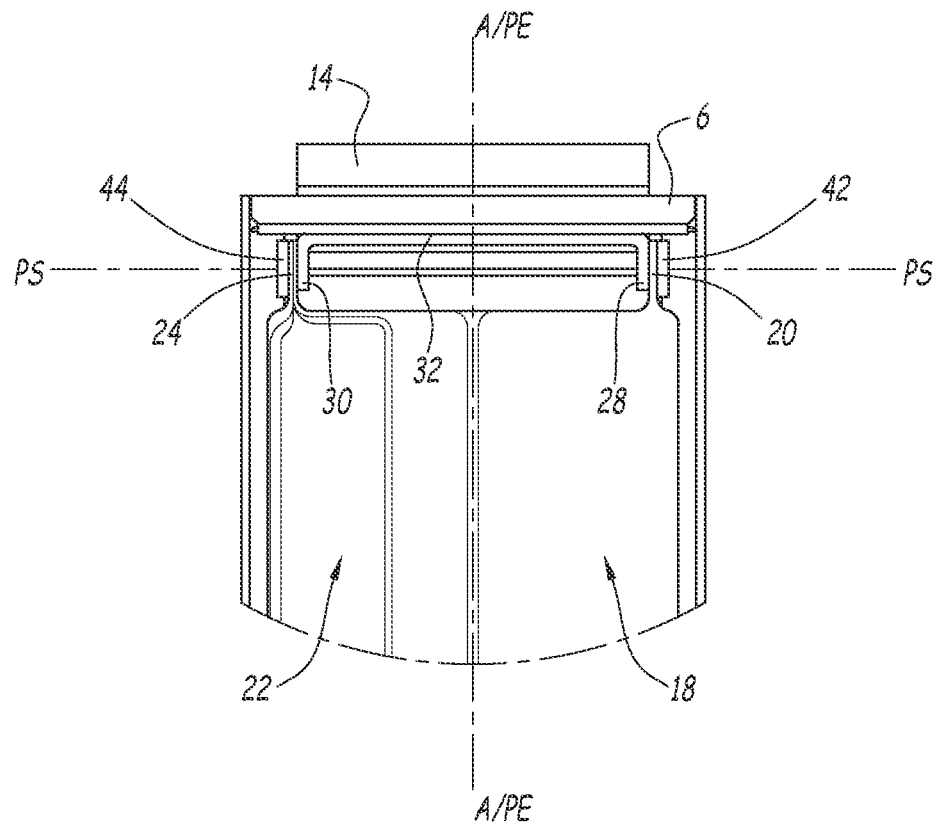
FIG. 6 is a magnified view of the detail VI shown in FIG. 5.

The first support element 42 and the second support element 44 define a support plane PS which extends perpendicular to the stacking plane PE and perpendicular to the transverse plane PT (see FIG. 6). The support plane PS is generally a plane wherein the first support element 42 and the second support element 44 are located.

The first electrical connection tab 20 is arranged between the first electrical connection rib 28 and the first support element 42. The second electrical connection tab 24 is arranged between the second electrical connection rib 30 and the second support element 44. The first support element 42 and/or the second support element 44 is e.g. each a support tab, in particular extending parallel to the associated electrical connection tab 20, 24. In a variant, the first support element 42 and/or the second support element 44 have a shape different from the shape of a tab. In general, each support element has a greater thickness than the electrical connection tab and than each of the strips of the electrical connection tab, respectively, to which said support element is associated and fastened.

Each support element is suitable for supporting the electrical connection tab and the associated electrical connection rib during the operation of fastening the electrical connection tab to the associated electrical connection rib. In particular, the support elements prevent the deformation of the electrical connection tab/electrical connection rib assembly during a welding or a brazing. Moreover, the support elements reduce the risk of forming holes in the connection tabs during welding or brazing.

The associated electrical connection rib, the electrical connection tab and the support element thus form a sandwich structure.

In the present case, the central core 46 is arranged substantially perpendicular to the support plane PS.

In the present case, the first electrical connection tab 20 and the second electrical connection tab 24 are arranged between the first and the second support elements 42, 44 (see FIG. 6).

The first common connection element 26 is fastened to the first electrical connection tab 20 by a material connection, in particular by laser welding.

The first electrical connection tab 20 is fastened to the first support element 42 by a material connection, in particular by laser welding, and in particular by the same material connection as the first common connection element.

The first common connection element 26 is fastened to the second electrical connection tab 24 by a material connection, in particular by laser welding. The second electrical connection tab 24 is fastened to the second support element 44 by a material connection, in particular by laser welding, and in particular by the same material connection as the common first connection element.

The structure of the electrical connection tabs and the electrical connection element connects the stacks of electrochemical elements along the tabs in a space-saving manner along the central axis A-A.

The structure of the battery 2 is substantially symmetrical.

The elements described above in association with the first polarity are also present in relation to the second polarity.

More precisely, the first stack of electrochemical elements 18 is provided with a third electrical connection tab 60 with a second polarity, and the second stack of electrochemical elements 22 is provided with a fourth electrical connection tab 64 with the second polarity.

The electrochemical assembly comprises a second common connection element 66 which electrically connects the third electrical connection tab 60 and the fourth electrical connection tab 66 and is suitable for electrically connecting the third electrical connection tab and the fourth electrical connection tab to the electrical connection terminal 16 with the second polarity.

The first common connection element 26 and the second common connection element 66 have an identical shape. The second common connection element 66 thus has the same structural features as the first common connection element 26.

The second common connection element 66 comprises a third electrical connection rib 68 fastened to the third electrical connection tab 60, and a fourth electrical connection rib 70 fastened to the fourth electrical connection tab 64.

The second common connection element 66 comprises an electrical connection core 72 arranged between the third electrical connection rib and the fourth electrical connection rib.

The electrical connection core 72 comprises an end portion 74 and a terminal portion 76, the terminal portion 76 being offset toward the stack of electrochemical elements 22 with respect to the end portion 34. n the present case, the electrical connection core 72 is stepped (see FIG. 2).

The electrochemical assembly 8 comprises a second support component 80, in particular a single piece, which forms a third support element 82 and a fourth support element 84 and which comprises at least a second central core 86 arranged between the third support element and the fourth support element.

The third electrical connection tab 60 is arranged between the third electrical connection rib 68 and the third support element, and the fourth electrical connection tab 64 is arranged between the fourth electrical connection rib 70 and the fourth support element.

The third electrical connection tab 60 and/or the third electrical connection rib extend substantially parallel to the stacking plane (PE) and the fourth electrical connection tab 64 and the fourth electrical connection rib extend substantially parallel to the stacking plane (PE).

The first common connection element 26 and the second common connection element 66 are arranged according to a plane symmetry configuration with respect to a symmetry plane (PT).

Figure 7:
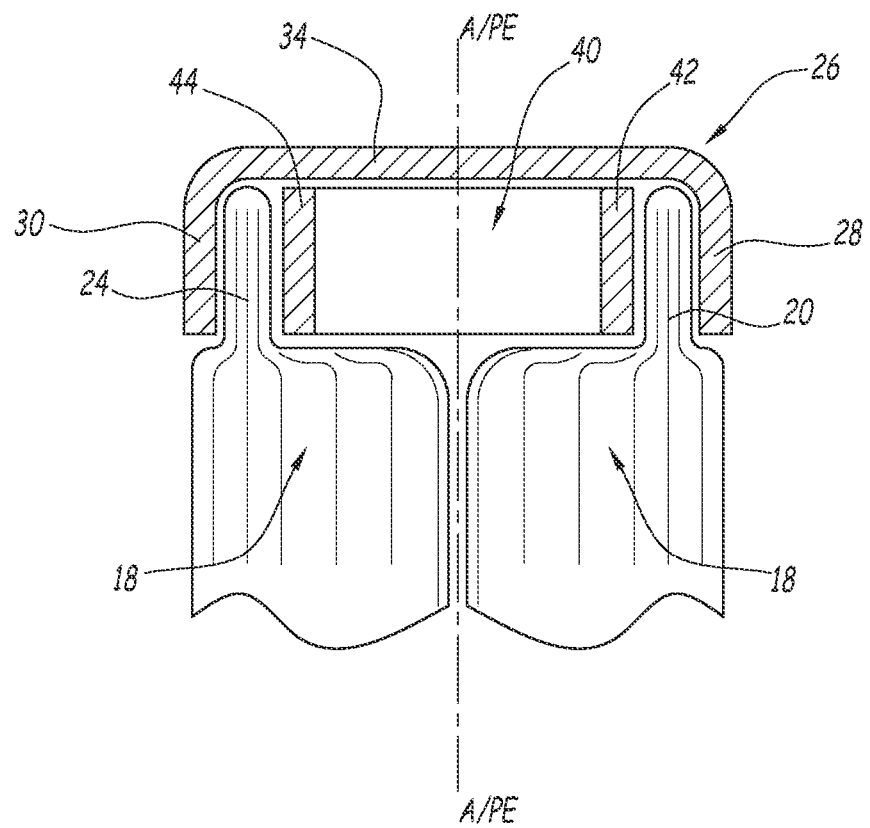
FIG. 7 is a schematic view of a detail of a variant of a battery shown in FIGS. 1 to 6.
Figure 8:
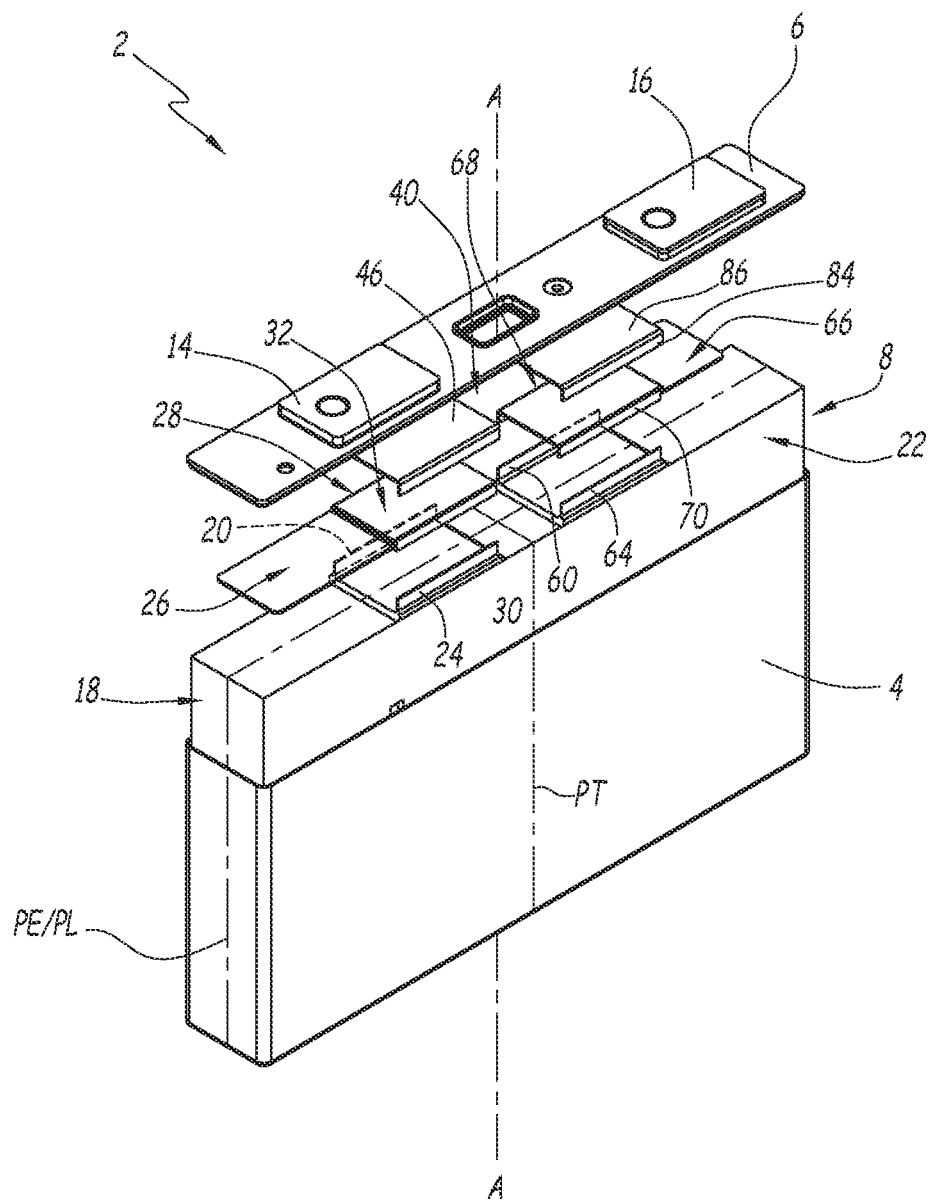
FIG. 8 is a schematic exploded perspective view of an electrochemical battery according to a second embodiment of the invention.
Figure 9:
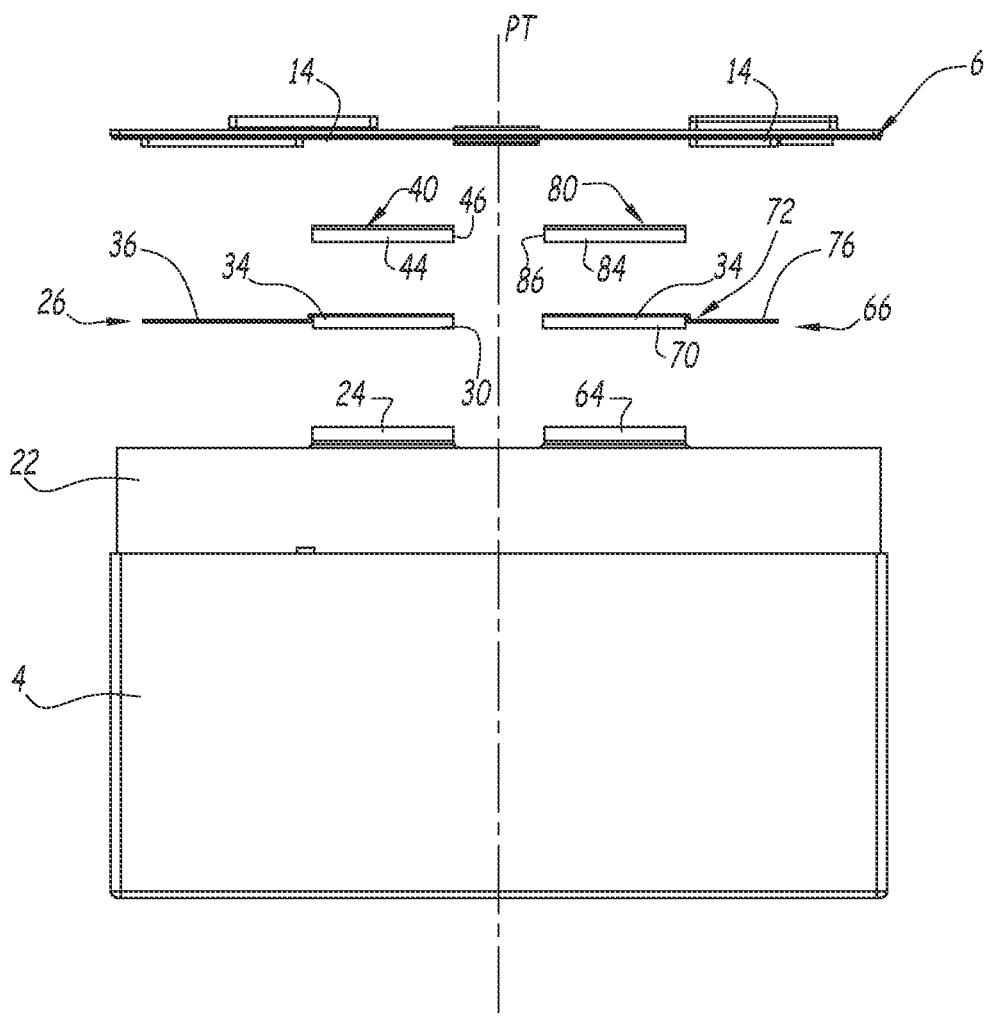
FIG. 9 is a schematic exploded side view of the electrochemical battery according to the second embodiment of the invention.
Figure 10:
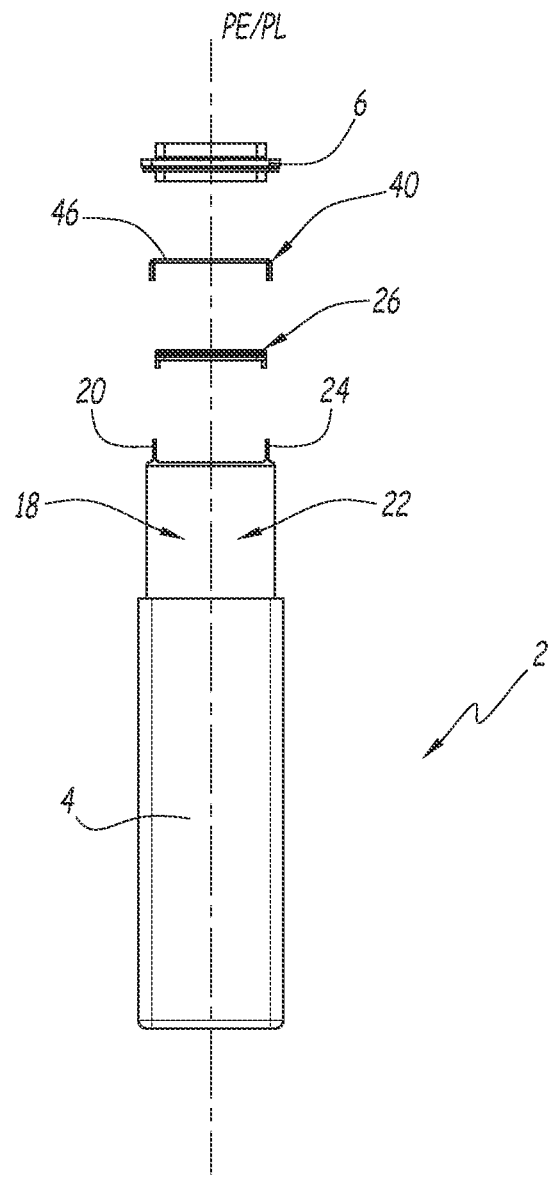
FIG. 10 is a schematic exploded front view of the electrochemical battery according to the second embodiment of the invention.
Figure 11:
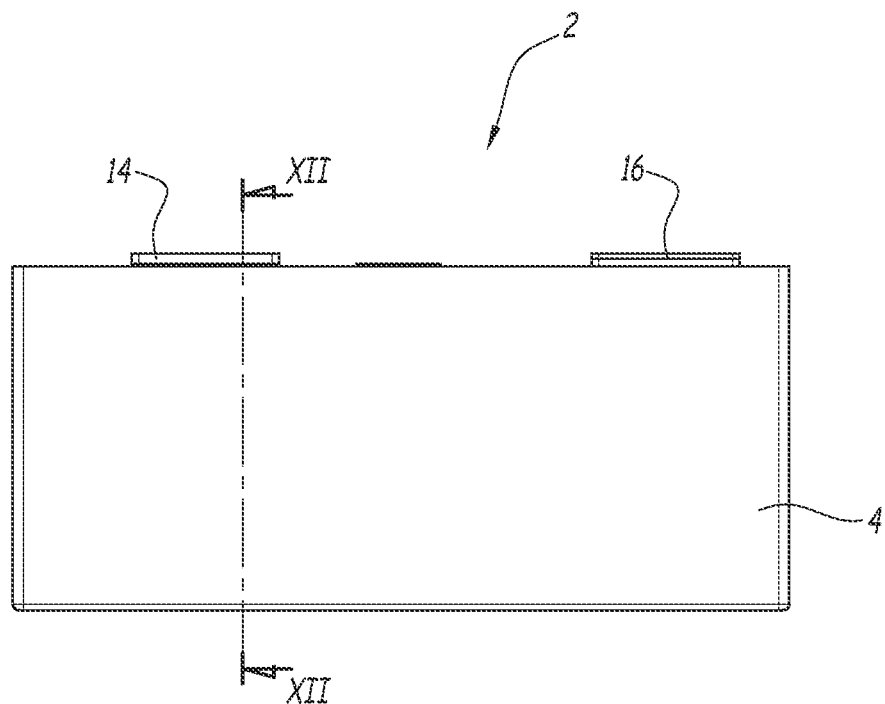
FIG. 11 is a schematic side view of the electrochemical battery in the assembled state, according to the second embodiment of the invention.
Figure 12:
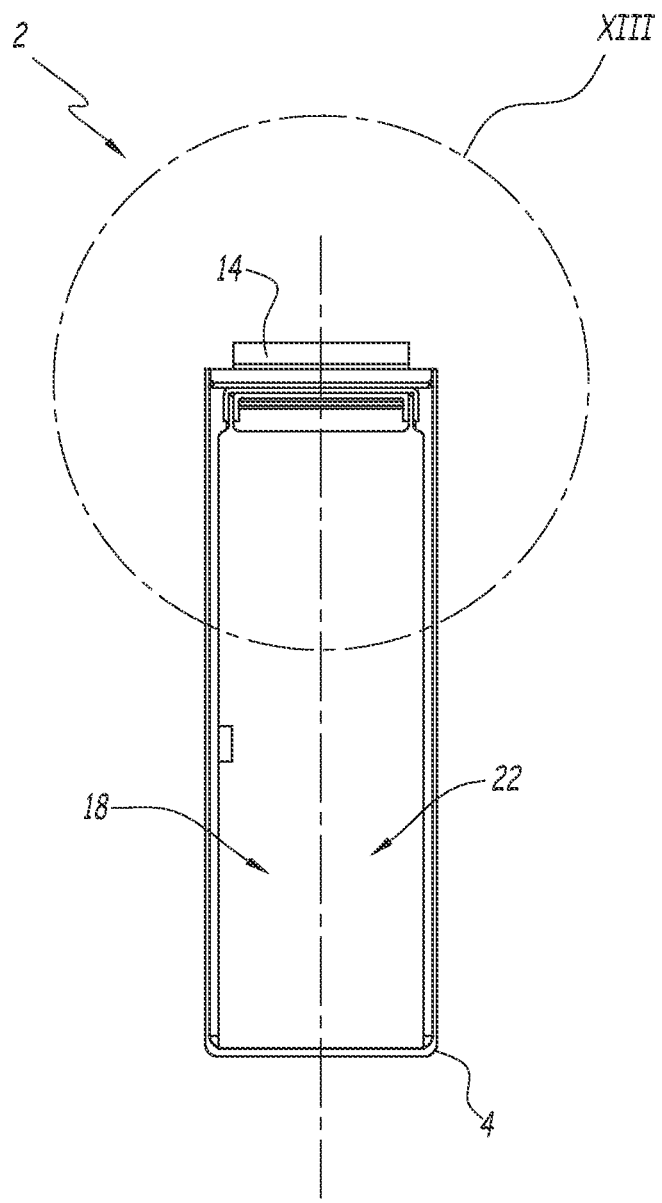
FIG. 12 is a section view along the plane XII-XII shown in FIG. 11.
Figure 13:
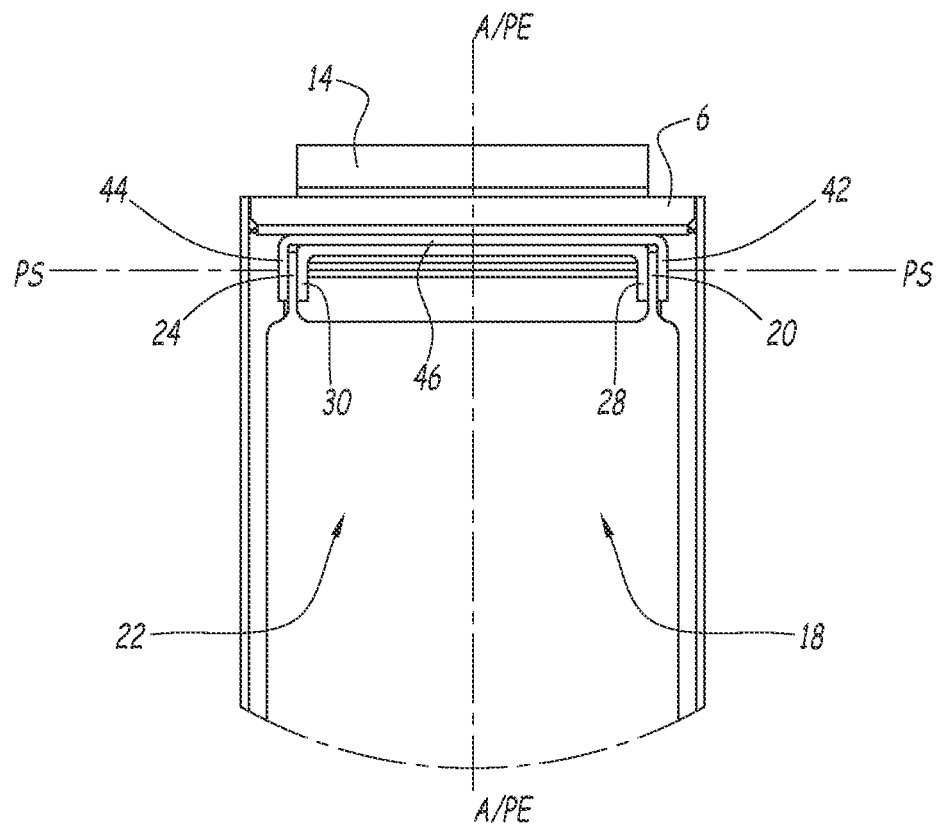
FIG. 13 is a magnified view of the detail XIII shown in FIG. 12.

FIG. 7 schematically shows a section of an electrochemical assembly according to a variant of the battery according to the above invention. Such variant differs from what has been described above only in the following. Similar elements have the same references.

The first support element 42 and the second support element 44 are arranged between the first and the second electrical connection tabs 20, 24. Also, the first electrical connection tab 20 and the second electrical connection tab 24 are arranged between the first electrical connection rib 28 and the second electrical connection rib 30.

In other words, the first support component 40 is arranged between the first electrical connection rib 28 and the second electrical connection rib 30. The configuration is thus inversed with respect to the configuration shown in FIG. 6. Moreover, the first support component 40 advantageously has the shape of a rectangular frame in order to prevent any deformation during the fastening step.

It should be noted that the second support component 80 and the second common connection element 66 can have a configuration identical to the configuration shown in FIG. 7 or the configuration shown FIG. 6, as described above.

FIGS. 8 to 13 show a second embodiment of the battery according to the invention. FIGS. 8 to 13 correspond to FIGS. 1 to 7. The second embodiment differs from the first embodiment only in the following. Similar elements have the same references.

The central core 46 of the first support component 40 is arranged substantially parallel to the support plane PS.

Similarly, the central core 86 of the second support component 80 is arranged substantially parallel to the support plane PS.

Thus, the central core 46, and 86, respectively, are connected along the long edges of the support elements 42, 44, and 82, 84, respectively. Also, the central core 46, and 86, respectively, cover the end portion 34, and 74, respectively, of the electrical connection core 32, and 72, respectively, and extends parallel thereto.

As a variant of the second embodiment, the support elements 42, 44 and/or 82, 84 can be arranged as in the variant shown in FIG. 7.

In a variant (not shown) of the embodiments described above, the common connection element, e.g. the element 26, comprises only one electrical connection rib, e.g. the rib 28. In such a case, either a single stack of electrochemical elements is connected to the common connection element, or the other stack of electrochemical elements is connected to the common connection element by other means than by an electrical connection rib.

Similarly, the support element can comprise only one support element or can consist of said support element.

This is e.g. applicable to batteries 2 which include only one stack of electrochemical elements.

In a variant, alternatively or additionally, the or each electrical connection tab and the associated electrical connection rib extend with respect to the stacking plane (PE) at an angle comprised between 0° and 45°.

The manufacturing process of an electrochemical assembly as defined above comprises, inter alia, the following successive steps:

providing the first stack of electrochemical elements 18 with the first electrical connection tab 20 with the first polarity, providing the first common connection element 26 suitable for electrically connecting the first electrical connection tab to the electrical connection terminal 14 with the first polarity, arranging the first electrical connection tab 20 between the first electrical connection rib 28 and the first support element 42, fastening and connecting the first electrical connection rib 28 and the first support element 42 to the first electrical connection tab.

Preferentially, during the fastening step, the first electrical connection tab and the first electrical connection rib extend at an angle which is either parallel or oblique (e.g. comprised between 0° and 60°) to the stacking plane PE.

The same steps are implemented for the second stack of electrochemical elements provided with the second electrical connection tab and, where appropriate, for the elements with the second polarity.

In such a case, fastening and connecting the first electrical connection rib 28 and the first support element 42 to the first electrical connection tab and fastening and connecting the second electrical connection rib 30 and the second support element 44 to the second tab electrical connection are made simultaneously.

The structure of the battery is compact while leading at the same time to a reliable electrical connection between the different elements. The battery is also easy and economical to manufacture, in particular due to the arrangement of the electrical connection tabs and the features of the common connection elements and of the support components.

The invention claimed is:

1. An electrochemical assembly of the type comprising
   a first stack of electrochemical elements provided with a first electrical connection tab with a first polarity, the first stack of electrochemical elements extending along a stacking plane,
   a second stack of electrochemical elements provided with a second electrical connection tab with the first polarity, the second stack of electrochemical elements extending along the stacking plane,
   a first common connection element electrically connecting the first electrical connection tab and the second electrical connection tab, and electrically connecting the first electrical connection tab and the second electrical connection tab to an electrical connection terminal with the first polarity, wherein the first common connection element comprises a first electrical connection rib fastened to the first electrical connection tab and a second electrical connection rib fastened to the second electrical connection tab,
   a first support component forming a first support element and a second support element, the first support component comprising at least one central core arranged between the first support element and the second support element,
   wherein
   the first electrical connection tab is arranged between the first electrical connection rib and the first support element,
   the second electrical connection tab is arranged between the second electrical connection rib and the second support element, and
   the second electrical connection tab and the second electrical connection rib extend substantially parallel to the stacking plane.

2. The electrochemical assembly according to claim 1, wherein the central core is arranged either substantially perpendicular or substantially parallel to a support plane defined by the first support element and the second support element.

3. The electrochemical assembly according to claim 1, wherein
   the first common connection element is fastened to the first electrical connection tab by a material connection, or by laser welding, and the first electrical connection tab is fastened to the first support element by a material connection, or by laser welding,
   or
   the first common connection element is fastened to the second electrical connection tab by a material connection, or by laser welding, and the second electrical connection tab is fastened to the second support element by a material connection, or by laser welding.

4. The electrochemical assembly according to claim 1, wherein the first common connection element comprises an electrical connection core arranged between the first electrical connection rib and the second electrical connection rib.

5. The electrochemical assembly according to claim 4, wherein the electrical connection core is stepped and comprises a terminal portion and an end portion, the terminal portion being offset toward the stack of electrochemical elements with respect to the end portion.

6. The electrochemical assembly according to claim 1, wherein
   the first electrical connection rib and the second electrical connection rib are arranged between the first and the second electrical connection tabs, and wherein
   the first electrical connection tab and the second electrical connection tab are arranged between the first and the second support elements.

7. The electrochemical assembly according to claim 1, wherein the first support element and the second support element are arranged between the first and the second electrical connection tabs, and wherein
   the first electrical connection tab and the second electrical connection tab are arranged between the first electrical connection rib and the second electrical connection rib.

8. The electrochemical assembly, according to claim 1, wherein
   the first stack of electrochemical elements is provided with a third electrical connection tab with a second polarity, and
   the second stack of electrochemical elements is provided with a fourth electrical connection tab with the second polarity,
   the electrochemical assembly comprising a second common connecting element, electrically connecting the third electrical connection tab and the fourth electrical connection tab and suitable for electrically connecting the third electrical connection tab and the fourth electrical connection tab to an electrical connection terminal with the second polarity,
   the second common connecting element comprises
   a third electrical connection rib fastened to the third electrical connection tab, and a fourth electrical connection rib fastened to the fourth electrical connection tab, wherein the electrochemical assembly comprises a second support component which forms a third support element and a fourth support element and which comprises at least one central core arranged between the third support element and the fourth support element, wherein the third electrical connection tab is arranged between the third electrical connection rib and the third support element, and the fourth electrical connection tab is arranged between the fourth electrical connection rib and the fourth support element, and wherein the third electrical connection tab and the third electrical connection rib extend substantially parallel to the stacking plane and the fourth electrical connection tab and the fourth electrical connection rib extend substantially parallel to the stacking plane.

9. The electrochemical assembly according to claim 8, wherein the first common connecting element and the second common connecting element (66) have an identical shape and are arranged according to a plane symmetry configuration with respect to a plane of symmetry.

10. A battery, of the type comprising
a casing,
a cover provided with an electrical connection terminal with a first polarity,
an electrochemical assembly,
wherein
the electrochemical assembly is an electrochemical assembly according to claim 1, and in that
the first common connection element is electrically connected to the electrical connection terminal with the first polarity.

11. A manufacturing process for the electrochemical assembly according to claim 1, comprising the following steps:
providing the first stack of electrochemical elements provided with the first electrical connection tab with the first polarity,
providing the first common connection element suitable for electrically connecting the first electrical connection tab to the electrical connection terminal with the first polarity,
arranging the first electrical connection tab between the first electrical connection rib and the first support element, and
fastening and connecting the first electrical connection rib and the first support element to the first electrical connection tab.

12. The electrochemical assembly according to claim 1, wherein the first electrical connection tab and the first electrical connection rib extend substantially parallel to the stacking plane.

13. The battery according to claim 10, wherein the cover is provided with an electrical connection terminal with a second polarity.

* * * * *